March 4, 1930. H. C. BEHR 1,749,368
CONTINUOUS SEPARATION OF LIQUIDS AND SOLIDS
Filed Sept. 1, 1927 2 Sheets-Sheet 1

INVENTOR
Hans C. Behr
BY
ATTORNEY

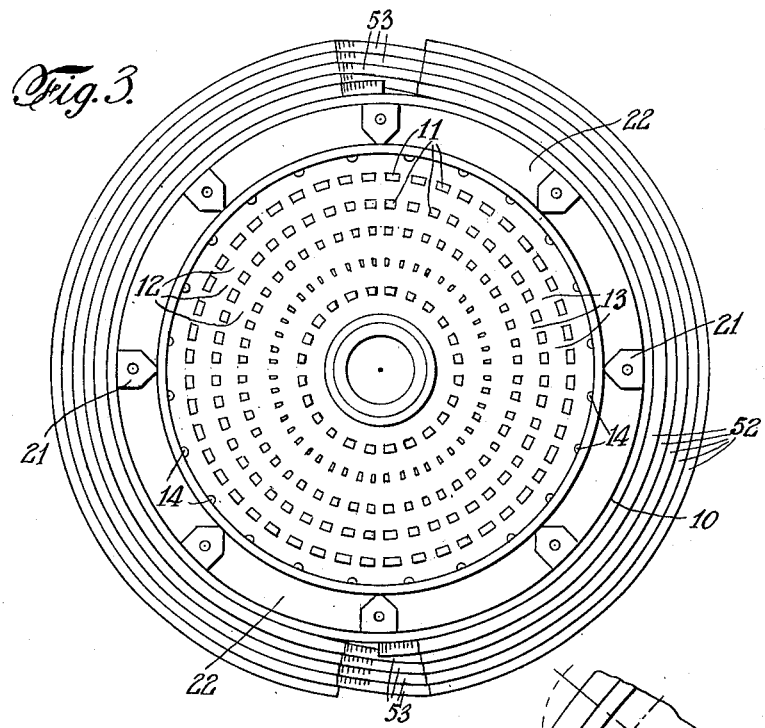

Patented Mar. 4, 1930

1,749,368

UNITED STATES PATENT OFFICE

HANS C. BEHR, OF SCARSDALE, NEW YORK

CONTINUOUS SEPARATION OF LIQUIDS AND SOLIDS

Application filed September 1, 1927. Serial No. 216,810.

The present invention relates to the art of continuously separating liquids and solids from a mass of material containing these, by the application of forces resulting from the suitable rotation and retardation of the portion of the material immediately under treatment.

The main object is to provide for such continuous separation in such a manner that not only will the coarser particles be freed from the liquid but a larger amount of the finer particles will also be retained than has heretofore been possible in continuous separation.

Briefly, the material is supplied in a continuous stream and this is subjected to the separating influences of the forces due to rotation in a gradually increasing manner as the mixture is moved outwardly from the center over some suitable screen by the radial component of such forces, while they are prevented from carrying the material outwardly by a too rapid rate by the slowing down or impeding of the movement over the screen and causing a dwell in its discharge in a regular and predetermined manner.

In the accompanying drawings a form of apparatus which may conveniently be employed for carrying out my process is illustrated, which consists of a separator, rotating at a high speed and a discharging device which may also be utilized for a secondary separating and washing, having a receiving capacity slower than the natural centrifugal discharging capacity of the separator in the first stage.

Figure 1 of these drawings shows, in central vertical section, a preferred form of apparatus suitable for use in carrying out my process.

Fig. 3 is an underside view of the parts shown in Fig. 2, and,

Figure 1:
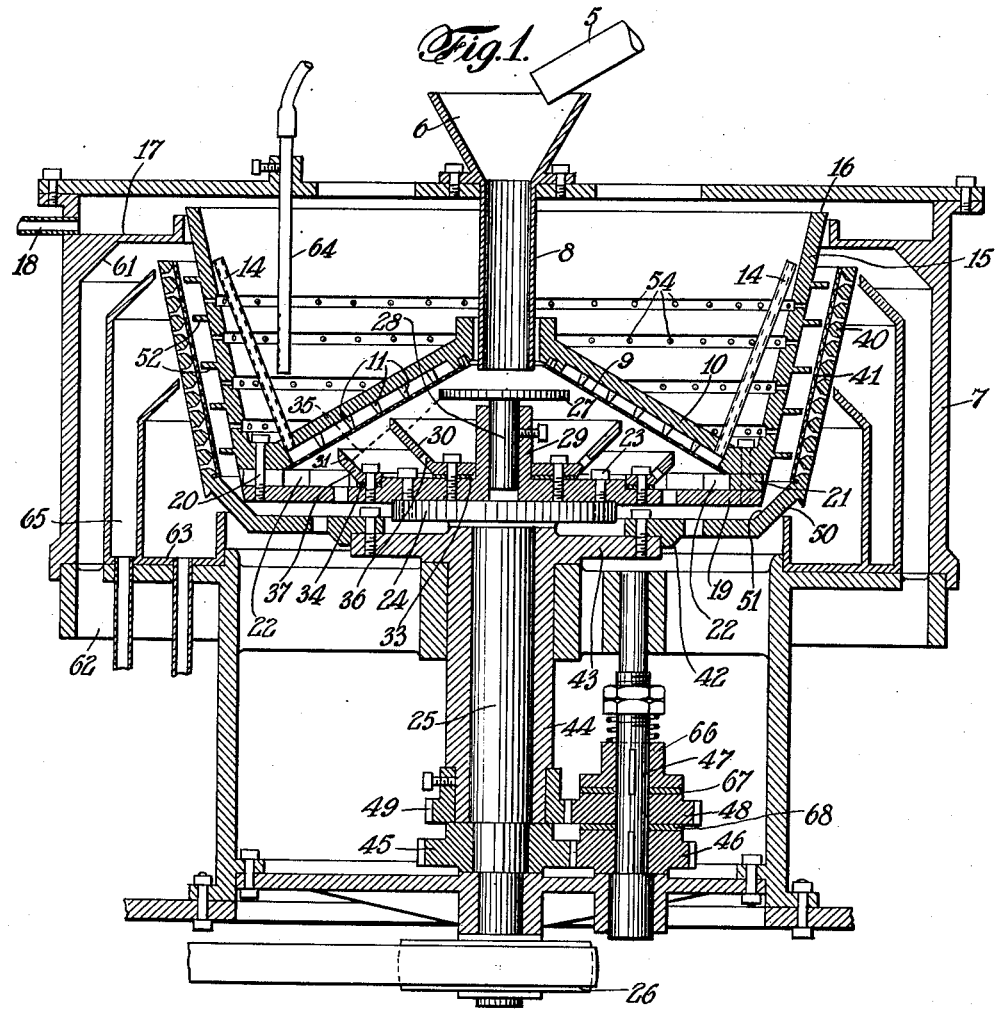
Figure 2:
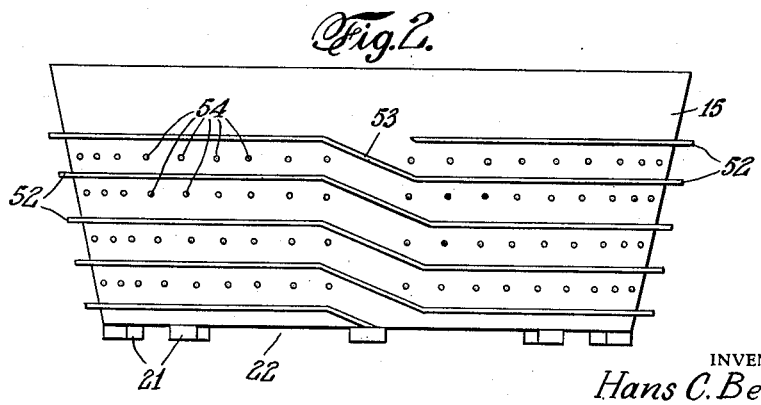
Fig. 2 is an elevation of the conveyor device.

Figs. 4 and 5 are details, on an enlarged scale, showing the formation of one of the baskets illustrated in Figure 1.

The material under treatment, which consists of a mixture of solids and liquids which it is desired to separate, generally for the purpose of freeing the solids from the liquid and for passing the liquid on for further treatment, is supplied, in the illustrated apparatus, in a continuous stream through a spout 5, discharging into a hopper, 6, which is supported on the main frame, 7, of the machine and to a point by means of a throat, 8, where it will be taken up for treatment and pass centrifugally over the under side of a conically disposed screen, 9.

The screen, 9, is shown resting upon and carried by a basket, 10, which is formed on its screen receiving face with a plurality of spaced apart studs, 11, the studs being preferably arranged in concentric circles so that there is afforded between them a plurality of concentric grooves, 12, and a series of connecting radially disposed grooves, 13, these grooves being for the passage of the liquid which is freed from the solids by means of centrifugal force. The angle of the screen, 9, with the horizontal is flatter than the angle of friction of the material passing over it, since the material has to be moved outwardly by the centrifugal force of its own mass.

The separation of the liquid from the solid part of the material begins while the material is near the center of rotation and consequently under small centrifugal pressure. This obviates any tendency of the solid particles to pack closely together. This freedom from unduly packing facilitates the escape of the liquid by centrifugal action, while at the same time fine solid particles are not so likely to be carried out through the screen with the liquid owing to the moderate centrifugal action. This effect is similar to that obtained in the ordinary intermittently operated cylindrical basket during the speeding up period when the speed and pressure are low at the beginning. The conical basket and screen, 10 and 9, permit much easier separation in a continuous manner.

The liquid flowing through passages or open spaces in and around the studs, 11, passes outwardly through a series of outlets, 14, illustrated in the form of upstanding pipes which are carried by the conveyor bowl, 15, portion of the basket, 10, presently to be described, and is discharged at a point somewhat below the rim, 16, of the bowl and is thrown off by centrifugal force for reception in the annular trough, 17, from which it may be led to some suitable receptacle by means of the broken-away discharge pipe, 18.

The basket, 10, and bowl, 15, are shown formed in a single casting which rests upon a plate, 19, to which it is secured by bolts, 20. The lower part of the member, 10—15, is provided with a number of wedge shaped blocks or lugs, 21, which rest upon the upper surface of the plate, 19, and through which lugs the bolts, 20, pass. The spaces, 22, between such lugs afford outlet passages for the separated solid material.

The plate, 19, is secured by bolts, 23, to the flanged head, 24, of the shaft 25. The shaft, 25, is shown mounted in the machine frame and driven by means of a belt passing over a pulley, 26.

There is located within the cone of the screen, 9, a guiding and deflecting device for the material under treatment, which deflecting device is mounted rigidly with the plate, 19 and consequently rotates with the basket, 10, and screen, 9. At the beginning of the movement or entrance of the stream of material over the screen, 9, it is guided and the thickness of the layer on the screen is regulated by means of such deflecting device, which is shown in the form of a number of ridges. The first ridge in the path of movement is a plate, 27, which has a dependent stem, 28, mounted in a sleeve, 29, upstanding from the center portion of the plate, 19, adjustment being permitted by means of a set screw. The other ridges are afforded by pan shaped members, 30—31, the bottoms of these pans resting upon the upper face of the plate, 19. These pans may be adjusted as to height by means of suitable shims, 33—34, and are held in position by suitable bolts.

These ridges are disposed at an angle to the path of such material, so that the centrifugal force drives the material upwardly and outwardly across or against such surfaces and while flowing or at rest it will bank up against these surfaces at its angle of repose represented by the stippled lines 35, which is the line of zero pressure in the material. This banking up of the material, while in a way restricting or constricting the space left open for the passage of the material owing to its mobility as conditions change, creates much less pressure than would be created if a conical uninterrupted surface were provided for similarly limiting or restricting the passage. Such increased pressure would also make adequate support of the screen, 9, difficult. To prevent the formation of a possible vacuum being formed in the spaces back of the face, 30—31, which might tend to cause the material to rise up and completely fill such spaces, thereby increasing the pressure, airholes, 36—37, are provided through the plates for admitting air to such spaces.

In the passage of the solids from this, which may be termed the first stage of the separation, to the second stage a dwell is caused in the movement of the material for impeding its movement across the screen, 9. This impedance of movement being for the purpose of permitting strong centrifugal action to be applied to the liquid for separating this from the solids and for continuing such action for a longer time than would be the case were the material under treatment permitted to move centrifugally at its normal rate of speed. This action does two things—prevents packing the solids together and it also permits the finer portions of the solids to remain in the mass travelling over the face of the screen rather than passing them with the liquid when the rate of travel from the screen is not thus impeded.

When my improved process is carried out with the mechanism illustrated herein, the device for causing the dwell in the delivery of the solids from the screen is in the form of a secondary separator embodying a basket, 40, which flares upwardly and outwardly. This basket and the screen, 41, which it carries, is rotated at a different rate of speed than is the screen and basket, 9 and 10, and in the present illustration at a slightly faster rate. The bottom, 42, of the basket is shown resting upon and bolted to a plate, 43, which is the flanged head of a tubular shaft, 44, surrounding the shaft, 25, and driven forward from it by means of a train of speeding up gears comprising a gear, 45, on the shaft, 25, meshing with a gear, 46, on a countershaft, 47, which countershaft also carries a gear, 48, meshing with a gear, 49, on the sleeve, 44. The number of teeth on these gears is so proportioned that the shaft, 25, drives the sleeve shaft, 44, forward at a slightly increased rate of speed.

Abnormal conditions of the material being treated, or the entrance of foreign bodies, may throw a too heavy load on this gear train. For the purpose of preventing injury to this, some form of slip connections may be employed. I have found that illustrated to be efficient in this type of centrifugal machine. The gear wheel, 48, is shown mounted loose on shaft, 47, the gear, 46, being fast. There is shown splined to the shaft, 47, a spring pressed clutch member, 66, which engages a friction disk, 67, placed on top of the gear wheel, 48. There is also a friction disk, 68, placed between the gear wheels, 48 and 46. The gear wheel 46, also is shown splined to the shaft.

During the passage of the material under treatment from throat, 8, over the ridges or faces, 27—30—31, which rotate at the same rate of speed as does the screen, 9, and basket 10, the material is given a gradually increasing energy of rotation which causes the liquid to pass outwardly through the screen and follow the passages 12 and 13 and flow out through the opening in pipes, 14, as above described. During the passage over the screen, 9, the greater quantity of liquid is removed and such solid material is thrown off centrifugally from the lower and outer end of the screen as it passes through the series of radially disposed openings, 22.

Between the foraminated screen carrying portion of the basket, 40, and its bottom plate, 42, there is shown a conical portion, 50, which has a conical surface flatter than the conical inner surface of the portion, 40. It is against the inner surface, 51, of this portion, 50, that the solids discharged from the screen, 9, are received and deflected and passed forward centrifugally to the screen, 41, which rests on the foraminous and internally grooved basket, 40.

The bowl portion, 15 is shown of general conical formation and carrying a conveyor plate or series of plates, 52. The general effect of these plates is spiral although in the preferred form the major portion of each plate lies in the same horizontal plane and the end of one plate is connected to the adjacent end of the next plate above it by a slanting portion, 53. For the purpose of balancing the structure as well as for regulating the speed of the movement of material, there are arranged two sets of these slanting portions, 53, disposed diametrically opposite, see Fig. 3. The mode of operation of this is described in my co-pending application Serial No. 74,932 filed December 12, 1925 issued November 29, 1927, No. 1,650,685. For the purpose of this description it can be said that it is for holding the solids against too rapid outward movement over the screen and holding the solids in position on the screen so that the liquid is thrown out tangentially. The mass of material is then raised by the slanting portions, 53, and during each half rotation of the bowl, 15, relatively to the basket, 40, and screen, 41, the material remains stationary on the screen.

The capacity of this conveying device is less than the normal centrifugal capacity of discharge of the screen, 9, so that a dwell is caused in the movement of the material from the screen, 9 for impeding movement across it.

In practice it has been demonstrated that the centrifugal force of the material passing over the screen, 41, at the first part of the conveyor formed by the plates, 52, is upwardly and against them, and that such plates act as baffles. During the latter part of the movement of the material across the screen, 41, the conveyor plates act to positively advance the material. This is a mere detail in the operation of the device, because the net result is the same whether the plates are impeding the passage of the material or forwarding it. The bowl is shown provided with a plurality of openings, 54, for permitting the outward movement of air to facilitate the discharge of the liquid through the screen, 41, and basket, 40.

The form of opening which I prefer using in the outer basket, 40, is illustrated in the detailed enlarged views 4 and 5. The basket is shown having on its inner or screen carrying face, a series of circumferential grooves, 55, at the bottoms of which there are numerous outlet slots, 56, for the passage of the liquid. The sides of the grooves, 55, slope at such an angle that no fine solids which may have passed through the screen, 41, can become bedded on the ridges, 57, between the grooves and will not lodge on their sides, but will slide into the slots, 56, which also have their ends sloped as at, 58, (see Fig. 5) by milling them out with a circular cutter represented at the dotted lines, 59. The slots, 56, are preferably formed in close succession, evenly spaced around the circumference leaving the triangular prisms, 60, as connections between the circumferential ridges, 57.

The operation of the process and of the necessary apparatus is as follows: Material consisting of a mixture of liquid with an aggregate of granular solids, like sugar or salt, being continuously supplied from pipe, 5, to the hopper, 6, flows down through feed pipe, 8, at the lower end of which the plate, 27, distributes the flow uniformly from its outer edge to the inner edge of screen, 9, from which point it advances outwardly and downwardly, its velocity and centrifugal force being gradually increased by frictional contact with the screen and with the surfaces, 30 and 31, below it. At the same time centrifugal force acts to drive the liquid content from the mixture and through the foraminous screen, 9, into the space below such screen, where it flows outwardly along the under surface of cone, 10, in the channels, 12 and 13, between the ridges, 11, and escapes through the pipes, 14, flying against the inner surface of the upper edge of the bowl, 15, upon which it rises and flies off the rim, 16, and is gathered in basin, 17, to be led away by pipe, 18.

The solids from which liquid has been mostly eliminated in the manner described, but which for a large part of the mixtures industrially separated will still contain liquid which must be separated, will leave conical screen, 9, through the spaces 22 and bank up against screen, 41, above conical face, 51. At this point they are given a slightly different rotation, (in the case illustrated higher) from that which they had at the outer edge of cone, 30, and are retained by centrifugal force until they are picked up by one of the lower inclines, 53, on conveyor body, 15, the latter having the slower rotation with screen, 9, and cone, 10. As previously described, the inclines 53 deliver the solid material up into the path of the next higher incline, 53, which, after said material has remained at rest on screen, 41, for a period depending on the circumferential spacing of the said inclines and on their difference in rotation from that of the material, in their turn pick up and elevate said material to the next higher incline and so on until it is thrown off at the upper edge of basket 40, onto the inner surface of cone, 61, and there diverted downwardly so as to drop out at the discharge gap, 62. During the traversing process just described undiluted liquid is ejected from the material on the lower portion of screen, 41, escaping through slots, 56, in basket, 40, and delivered into basin, 63. On the upper part of screen, 41, the remaining liquid adhering to the solid particles may be washed off by means of a spray from pipe, 64, and gathered for further distribution in annular basin, 65.

The intermittent movement in the manner described of the material treated between screen, 41, and conveyor body, 15, since this material forms an uninterrupted continuation of the material on conical screen, 9, will control or delay the rate and manner of movement outwardly of the said material on said screen, 9, so that it will take place in narrow parts and in steps with intermediate comparatively long periods of rest in conformity with that produced by the inclines, 53, in traversing the material over the outer screen, 41.

For some materials, from which the liquid is easily separated, and which require no final washing, the entire separation may be completed on the inner conical screen, 9. In such cases the outer basket, 40, will have merely a smooth inner surface without any perforations or grooves or screen, becoming then a mere circumferential carrier for moving the material on its surface relatively to the inclines, 53, on conveyor body, 15, and effecting the ultimate discharge of said material at its upper edge, at the same time causing corresponding movement of the material on screen, 41.

It will be obvious that other mechanisms not illustrated herein may be employed for carrying out my improved method, and that in this particular form of mechanism illustrated, various changes may be made within the scope of the claims without departing from the spirit of the invention.

Having described my invention I claim and desire to secure by Letters Patent:

1. Apparatus for separating in two stages liquid from solids, comprising means for supplying a continuous stream of the material under treatment, a rotary screen, means for causing the material to move centrifugally over the screen with gradually increasing energy of rotation, a second stage embodying a rotary receiving device having a receptive capacity less than the natural rate of centrifugal delivery from the first stage, for impeding the movement over the screen in the first stage.

2. Apparatus for separating in two stages liquid from solids, comprising means for supplying a continuous stream of the material under treatment, a rotary screen, means for causing the material to move centrifugally over the screen with gradually increasing energy of rotation, a second stage embodying a rotary screen having a receptive capacity less than the natural rate of centrifugal delivery from the first stage, for impeding the movement over the screen in the first stage.

3. In a centrifugal machine the combination with means for supplying material, of a rotary screen, means rotatable with the screen for deflecting the material toward the screen and for guiding the deflected material over it, and means for causing a dwell in the movement of the solid material from the screen for impeding the movement across it.

4. In a centrifugal machine the combination with means for supplying material, of a rotary screen, means rotatable with the screen for deflecting the material toward the screen and for guiding the deflected material over it, such deflecting means comprising a number of ridges disposed at an angle to the path of material movement.

5. In a centrifugal machine the combination with means for supplying material to be separated, of a rotary screen of generally conical formation, means rotatable with the screen and located within the hollow of the cone for deflecting the material toward the screen and guiding the deflected material over it, such deflecting means comprising a number of ridges disposed at an angle to the direction of advance of the material and adapted to cause the material to bank up against them at its angle of repose, means for leading the liquid away from behind the screen, and means for receiving the solids at a slower rate than the natural rate of centrifugal delivery from the screen.

6. In a centrifugal apparatus, the combination with means for supplying material to be separated, of a rotary screen of somewhat flattened conical formations, means located within the cone of the screen and rotatable therewith for guiding the material over it, a second screen located in position for receiving material from the first screen, but having a slower receptive rate than the normal centrifugal discharging rate of the first screen, and means for centrifugally and separately removing the liquid from each of the screens.

7. In a centrifugal apparatus the combination with a conical basket having a screen supporting means on its inner surface, of a screen located on such supporting surface, means for supplying material for treatment at the smaller part of the screen, means for deflecting and guiding such material across the screen, means for centrifugally removing the liquid from between the screen and the support, a second screen supporting means located in position to receive the material discharged from the first screen and provided with a screen and means for centrifugally removing the liquid.

8. In a centrifugal apparatus the combination with a conical basket having a screen supporting means on its inner surface, of a screen located on such supporting surface, means for supplying material for treatment at the smaller part of the screen, means for deflecting and guiding such material across the screen, means for centrifugally removing the liquid from between the screen and the support, a second screen support provided with means located in position for receiving the material discharged from the first screen and provided with a screen and means for centrifugally removing the liquid.

9. A basket for supporting the screen of a centrifugal machine having a series of circumferential grooves, the sides of the grooves sloping at such an angle that fine solids will not become bedded on the ridges between such grooves, the material at the bottom of the grooves being provided with openings leaving between them a series of triangular prisms acting as connectors for the circumferential ridges between the grooves.

Signed at New York, N. Y., this 30th day of August, 1927.